(12) United States Patent
Vauchel et al.

(10) Patent No.: US 8,540,185 B2
(45) Date of Patent: Sep. 24, 2013

(54) MODULAR AIR INLET LIP WITH ELECTRIC DEFROSTING FOR A TURBOJET POD

(75) Inventors: Guy Bernard Vauchel, Le Havre (FR); Jean-Fabrice Marcel Portal, Saint Adresse (FR); Laurent Albert Blin, Saint Adresse (FR); Christophe Thorel, Le Havre (FR)

(73) Assignee: Aircelle, Gonfreville l'Orcher (FR)

( * ) Notice: Subject to any disclaimer, the term of this patent is extended or adjusted under 35 U.S.C. 154(b) by 616 days.

(21) Appl. No.: 12/279,735

(22) PCT Filed: Mar. 19, 2007

(86) PCT No.: PCT/FR2007/000463
§ 371 (c)(1),
(2), (4) Date: Aug. 18, 2008

(87) PCT Pub. No.: WO2007/122307
PCT Pub. Date: Nov. 1, 2007

(65) Prior Publication Data
US 2009/0134272 A1    May 28, 2009

(30) Foreign Application Priority Data
Mar. 24, 2006 (FR) ...................................... 06 02548

(51) Int. Cl.
*B64D 33/02* (2006.01)
(52) U.S. Cl.
USPC ..................................... 244/53 B; 244/134 D

(58) Field of Classification Search
USPC ............................ 244/53 B, 54, 134 D, 134 R
See application file for complete search history.

(56) References Cited

U.S. PATENT DOCUMENTS

| | | | | |
|---|---|---|---|---|
| 6,328,258 | B1 * | 12/2001 | Porte | 244/53 B |
| 7,513,458 | B2 * | 4/2009 | Layland et al. | 244/134 D |
| 7,588,212 | B2 * | 9/2009 | Moe et al. | 244/134 D |
| 2006/0237590 | A1 * | 10/2006 | Layland et al. | 244/134 D |

FOREIGN PATENT DOCUMENTS

| | | |
|---|---|---|
| EP | 1495963 A2 | 1/2005 |
| EP | 1715159 A1 | 10/2006 |
| EP | 1715160 A1 | 10/2006 |
| FR | 2874370 A1 | 2/2006 |
| GB | 1190933 | 5/1970 |
| GB | 1247071 | 9/1971 |
| GB | 1314162 | 4/1973 |

* cited by examiner

*Primary Examiner* — Tien Dinh
*Assistant Examiner* — Michael A Fabula
(74) *Attorney, Agent, or Firm* — Porzio, Bromberg & Newman, P.C.

(57) ABSTRACT

A lip of an air inlet of a turbojet pod intended to be fastened to an air inlet downstream structure includes at least one electric heating element for defrosting. The electric heating element being fitted with at least one electrical connector able to be connected to at least one corresponding electricity supply connector of the downstream structure. The lip breaks down into at least two identical structures set end-to-end on a periphery of the air inlet.

11 Claims, 4 Drawing Sheets

MODULAR AIR INLET LIP WITH ELECTRIC DEFROSTING FOR A TURBOJET POD

CROSS REFERENCE TO RELATED APPLICATION

This is a National Stage of International Application No. PCT/FR2007/000463, filed 19 Mar. 2007, which claims the benefit of Application No. 06.02548, filed in France on 24 Mar. 2006, the disclosures of these Applications are incorporated by reference herein.

BACKGROUND OF THE INVENTION

1. Field of the Invention

The present invention relates to an air inlet lip for a turbojet pod, which is to be attached to a downstream air inlet structure and which comprises at least one electric heating element for de-icing, together with a corresponding downstream structure; the invention also relates to a turbojet pod comprising an air inlet according to the invention.

2. Description of Related Art

An aircraft is propelled by one or more propulsion units, each comprising a turbojet housed in a tubular pod. Each propulsion unit is attached to the aircraft by a pylon which is generally located under a wing or on the fuselage.

The structure of a pod generally comprises an air inlet upstream of the engine, a mid-section designed to enclose a turbojet fan, and a downstream section housing thrust reversal means and designed to enclose the combustion chamber of the turbojet, and generally terminates in a jet nozzle whose outlet is located downstream of the turbojet.

The air inlet comprises, on the one hand, an inlet lip adapted in such a way that the air required for the supply of the fan and the internal compressors of the turbojet is captured and guided towards the turbojet in an optimal way, and, on the other hand, a downstream structure onto which the lip is fitted and which is designed to channel the air appropriately towards the blades of the fan. The assembly is attached upstream of a fan casing belonging to the upstream section of the pod.

In flight, depending on the temperature and humidity, ice may form on the pod at the position of the air inlet lip. The presence of ice or frost modifies the aerodynamic properties of the air inlet and perturbs the guidance of air towards the fan. Furthermore, fragments of ice may possibly break away from the air inlet lip and collide with components of the turbojet such as the fan blades.

Moreover, the air inlet lip is a component which is subject to numerous impacts with external elements such as grit, birds, hail, etc., which can damage the aerodynamic integrity of the outer surface and lead to premature wear.

Since the performance of the turbojet is dependent on the quantity and quality of the air capture provided by the air inlet, a defective lip must be replaced as rapidly as possible. Such a replacement is a time-consuming and expensive maintenance operation, since it is possible for only one part of the lip to be damaged.

In a first method for de-icing an air inlet lip, hot air is drawn from the turbojet compressor and directed to the inlet lip, where it heats the walls by flowing through an internal channel in the air inlet lip. However, a device of this kind requires a system for conveying the hot air between the turbojet and the air intake, as well as a system for discharging the hot air at the air inlet lip. This increases the weight of the propulsion unit, which is undesirable. A further consequence of this system is that, in order to avoid having a multiplicity of hot air intakes and outlets, the air inlet lip is made in one piece having a continuous peripheral internal passage for the flow of the hot air, and therefore the whole component has to be changed if its outer profile is damaged.

A second method, described in EP 1 495 963, is that of applying a heating resistor to an outer wall of the air inlet lip, this resistor being supplied from a power source in the pod. This technology enables a modular air inlet lip to be formed from a plurality of basic structures. Although less complicated, the changing of one or more structures is still time-consuming because of the need to reconnect the power supply means of the structure.

According to EP 1 175 160 and EP 1 715 159, the replacement of the lip can be facilitated by producing an air inlet lip designed to be attached to a downstream air inlet structure and comprising at least one electric heating element for de-icing, characterized in that said electric heating element is provided with at least one electrical connector which can be connected to at least one corresponding power supply connector of the downstream structure. Thus the provision of electrical connectors greatly facilitates the assembly of the air inlet lip, and particularly the restoration of the electrical connections, since it is simply necessary to plug each electrical connector of the lip into the corresponding power supply connector, as in any electrical plug and socket system, in order to restore the continuity of the electrical circuit.

BRIEF SUMMARY OF THE INVENTION

The object of the present invention is to improve further the ease of replacement of such an air inlet lip; for this purpose, the invention proposes an air inlet lip for a turbojet pod designed to be attached to a downstream air inlet structure and comprising at least one electric heating element for de-icing, said electric heating element being provided with at least one electrical connector which can be connected to at least one corresponding power supply connector of the downstream structure, characterized in that the lip is made up of at least two identical structures butted together on a periphery of the air inlet.

Thus, by forming the lip from identical modules, it is possible to replace a damaged part of the lip without changing the undamaged structures. Furthermore, making these structures identical facilitates their replacement even further, because it avoids the multiplication of spare parts.

Advantageously, the lip is made up of four identical structures butted together.

In a first variant embodiment, at least one electrical connector is located substantially in the centre of each structure.

In a second variant embodiment, at least one electrical connector is located substantially at one end of each structure.

Advantageously, at least one electrical connector is located at each end of the structure, each connector being capable of receiving a conducting cap to maintain the electrical continuity of the connector which is not intended to be connected to the corresponding power supply connector.

The present invention also relates to a downstream structure for an air inlet of a turbojet pod designed to receive a lip according to the invention, characterized in that it comprises at least one power supply connector which can interact with a corresponding electrical connector of the air inlet lip, said electrical connector being fixed in a front partition of the downstream structure.

In a first variant embodiment, the front partition comprises at least one opening for access to the power supply connector.

In a second variant embodiment, the power supply connector is mounted in a removable plate forming part of the front partition.

Advantageously, the downstream structure comprises at least one hatch formed in an outer wall and allowing access to the power supply connector. The hatch is also advantageously located at a junction between two structures according to the invention.

Alternatively, the downstream structure has an outer wall which is at least partially associated with movable covers provided in a mid-section of the pod. This makes it unnecessary to form hatches in the structure, since access is provided by opening the movable covers of the mid-section structure.

Finally, the present invention relates to a turbojet pod, characterized in that it comprises an air inlet comprising a downstream structure according to the invention on which an air inlet lip according to the invention is fitted.

The application of the invention will be made clearer by the following detailed description, which refers to the attached drawing in which:

DETAILED DESCRIPTION

Figure 1:
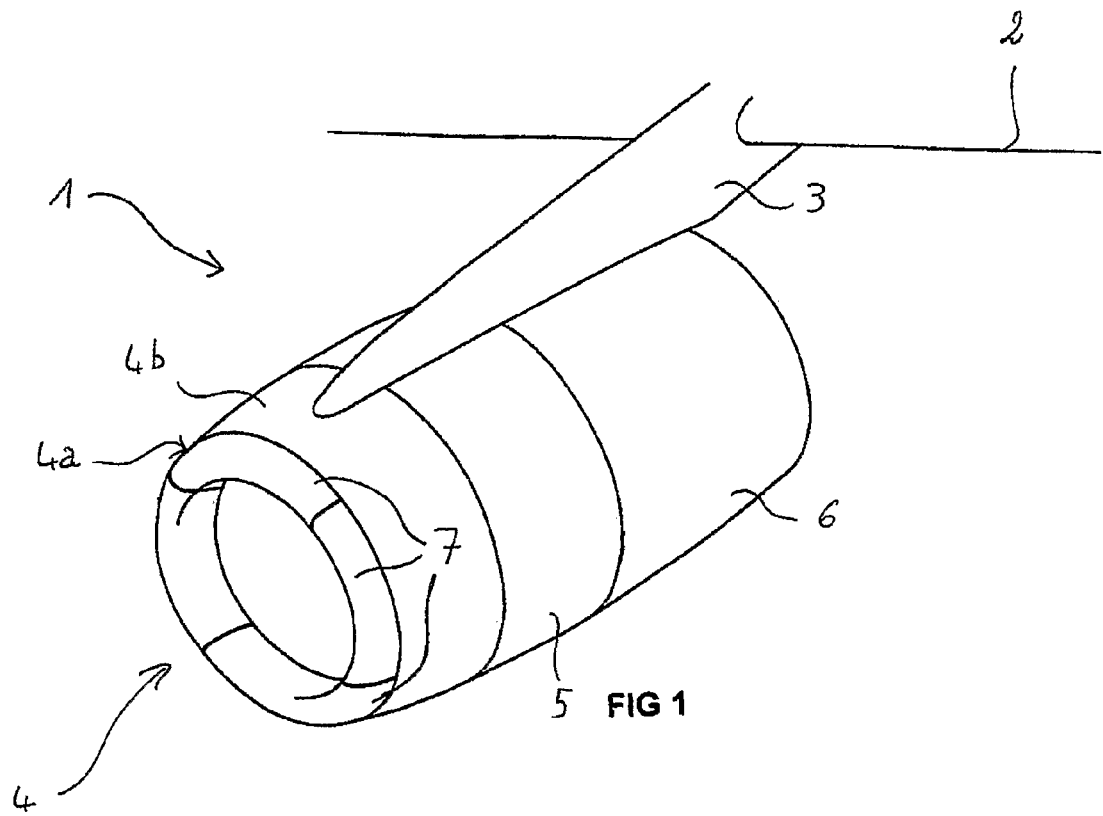
FIG. 1 is a schematic perspective view of a pod according to the invention.
Figure 2:
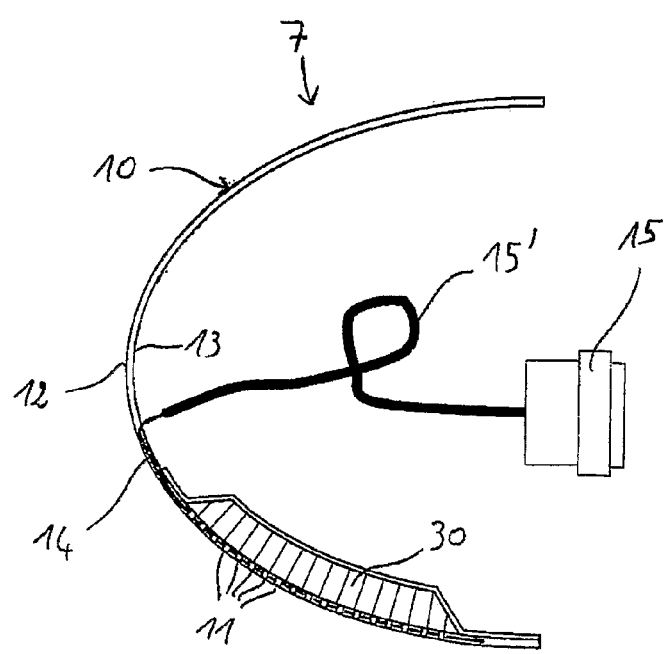
FIG. 2 is an enlarged cross sectional view of an air inlet lip structure according to the invention.
Figure 3:
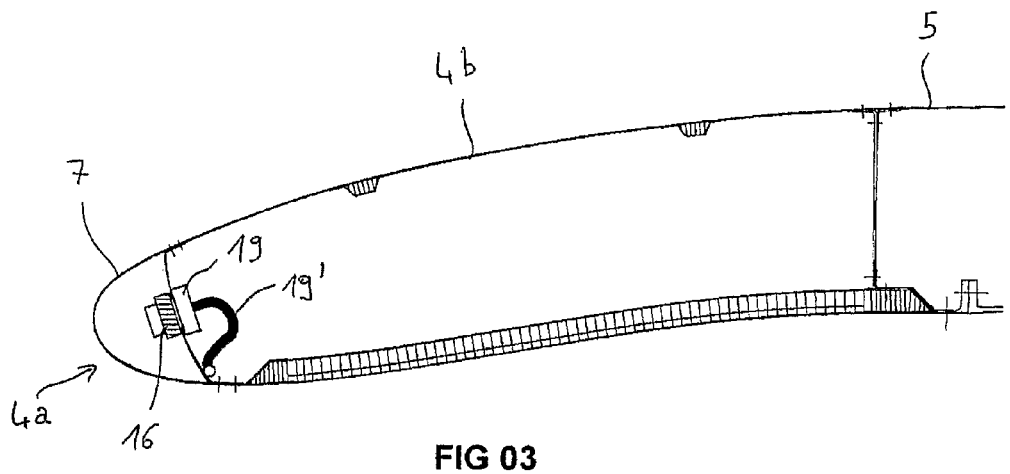
FIG. 3 is a schematic enlarged cross sectional view of an air inlet of the pod shown in FIG. 1.
Figure 4:
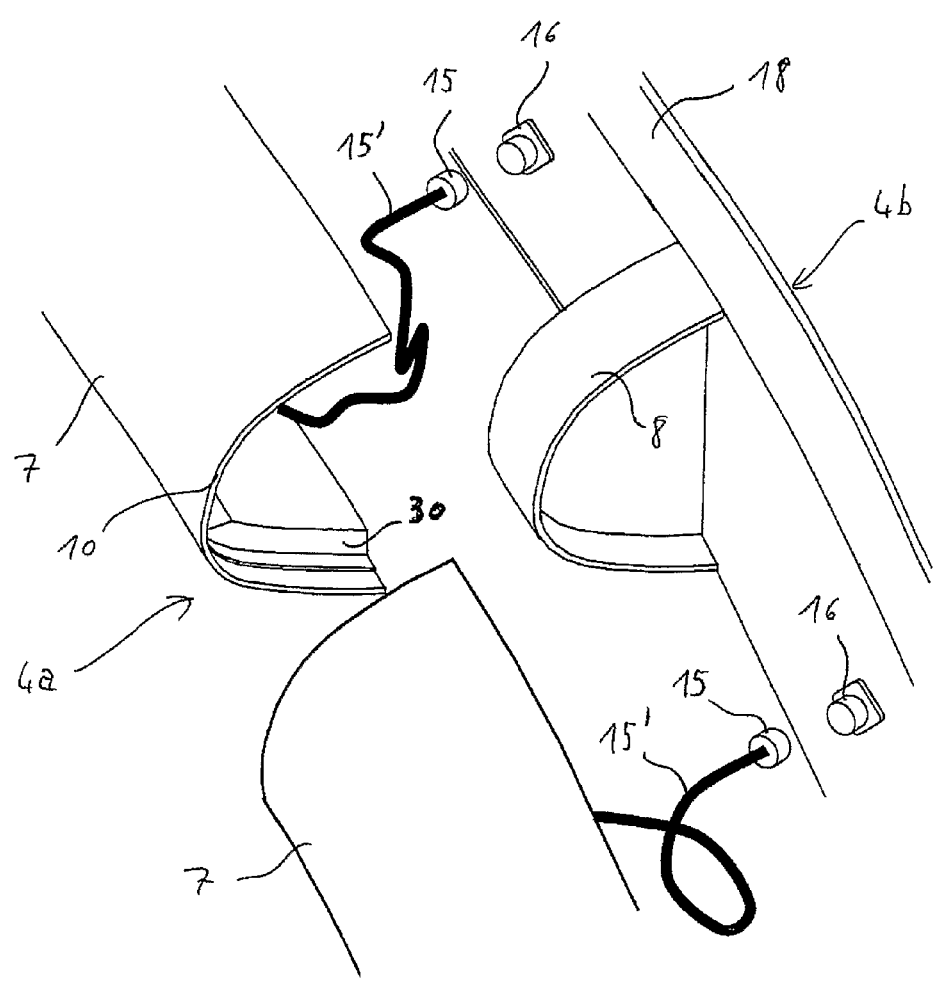
FIG. 4 is an exploded enlarged partial perspective view of the air inlet lip produced from structures according to FIG. 2.

Reference will now be made in greater detail to a preferred embodiment of the invention, an example of which is illustrated in the accompanying drawings. Wherever possible, the same reference numerals will be used throughout the drawings and the description to refer to the same or like parts.

A pod 1 according to the invention, as shown in FIG. 1, forms a tubular housing for a turbojet (not shown) and serves to channel the air flows generated by the latter. The pod 1 is located under a wing 2 to which it is attached by a pylon 3. It also houses various components required for the operation of the turbojet.

More precisely, the pod 1 has a structure comprising a forward section forming an air inlet 4, a mid-section 5 enclosing a turbojet fan (not shown), and a rear section 6 enclosing the turbojet and housing a thrust reversal system (not shown).

The air inlet 4 is divided into two parts, namely, on the one hand, an inlet lip 4a adapted in such a way that the air required for the supply of the fan and the internal compressors of the turbojet is captured and guided towards the turbojet in an optimal way, and, on the other hand, a downstream structure 4b onto which the lip is fitted 4a and which is designed to channel the air appropriately towards the blades of the fan. The assembly is attached upstream of a fan casing belonging to the mid-section 5 of the pod 1.

As shown more specifically in FIGS. 1 to 5, the lip 4a of the air inlet 4 is formed using structures 7 according to the invention fitted onto the downstream structure 4b around the whole periphery of the pod 1. Each structure 7 is separated from the adjacent structure 7 by a separating element 8 fixed to the downstream structure 4b.

In this case, the lip 4a of the air inlet 4 is formed from four structures 7. Clearly, it could be formed using two structures 7, or in one piece, or from more than four structures 7.

Each structure 7 comprises a wall 10, shaped so as to impart the desired profile to the lip 4a, and an acoustic damping structure 30, of the honeycomb type, this being located in contact with an area of the wall 10 facing the entrance to the fan, and being provided with a multiplicity of regularly spaced perforations 11.

The wall 10 of the structure 7 has an outer skin 12 designed to face toward the outside of the lip 4a, an inner skin 13 designed to face toward the inside of the lip 4a, and an electric heating element 14 located between the inner skin 13 and the outer skin 12. The electric heating element 14 is designed to be connected to a power outlet 16 of the downstream structure 4b by means of a connector 15 connected to a power supply cable 15'. This cable 15' is omitted from FIG. 3 to avoid excessive complication of the drawing. It should be noted that clip-type retaining means (not shown) for the cable 15' can be provided.

The outer skin 12 provides the aerodynamic outer profile of the lip 4a. It may be made from metal or composite material, and may be preformed or formed during the positioning of the electric heating element 14. The outer skin 12 is relatively thin, in order to ensure good heat transmission toward the outside of the lip 4a. For example, the thickness of the lip could be several tenths of a millimeter.

The inner skin 13 covers the electric heating element 14 and finishes the wall 10. As in the case of the outer skin 12, it may be made from metal or composite material, and may be preformed or formed during the positioning of the electric heating element 14. It should be noted that the thicknesses of the outer skin 12 and the inner skin 13 are not necessarily identical.

The different layers making up the wall 10 of the structure 7 are joined together by a joining material such as adhesive or resin (not shown).

The electric heating element 14 is of the punched metallic resistor type. A particularly advantageous shape of the electric heating element 14 is a zigzag shape. Clearly, it should be ensured that the surface of the electric heating element 14 can reach the desired de-icing temperature.

As mentioned above, the electric heating element 14 is supplied by means of a cable 15' connected to a power source. This cable 15' passes through the inner skin 13 of the structure 7 in the proximity of the centre of the latter, and is then connected to the power source of the downstream structure 4b of the air inlet 4 by means of its connector 15. Care must be taken to protect this electrical cable 15' during the fabrication of the wall 10 and especially during the polymerization of the inner skin 13 and of the outer skin 12, and of the resins if organic skins of composite material are used.

FIGS. 7 to 11 show various configurations of the electric heating element 14. It should also be noted that a plurality of electric heating elements 14 can be fitted in parallel. Even if one electric heating element 14 fails, the other electric heating elements 14 can continue to provide their de-icing function.

It is also possible to have a plurality of layers of electric heating elements 14, arranged in configurations which may be different.

Additionally, the downstream structure 4b comprises a front partition 18 in which a connector 19 is fitted for each structure 7 of the lip 4a, each connector 19 being connected to a power source (not shown) of the pod 1 by means of a power supply cable 19'. Each connector 19 is also designed to interact with the connector 15 of the corresponding structure 7 by means of the power outlet 16.

Figure 6:
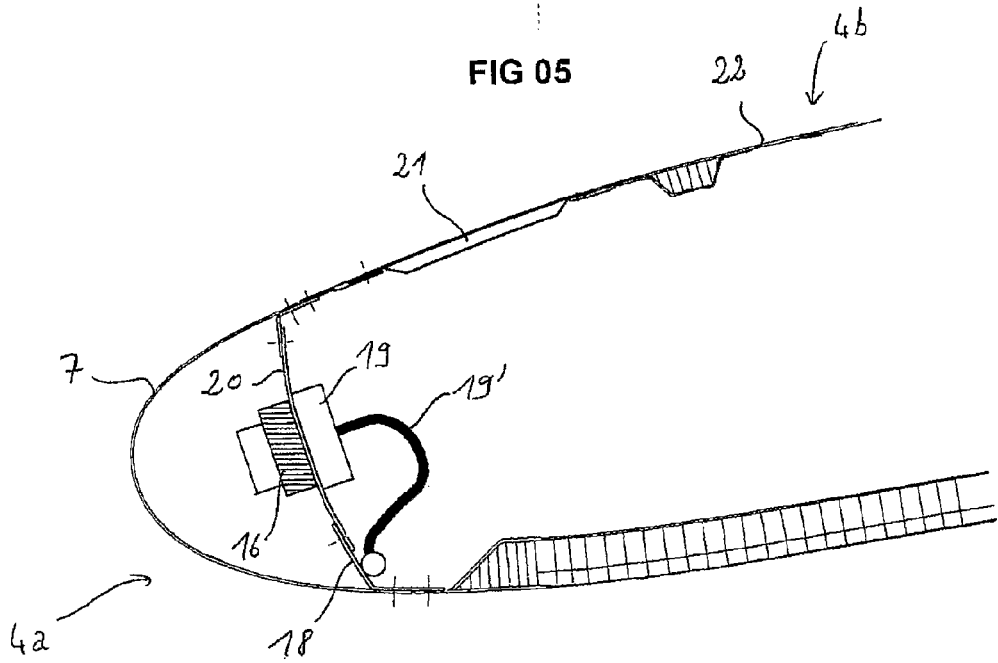
FIG. 6 is an enlarged cross sectional view of another air inlet comprising a downstream structure provided with hatches.
Figure 7:
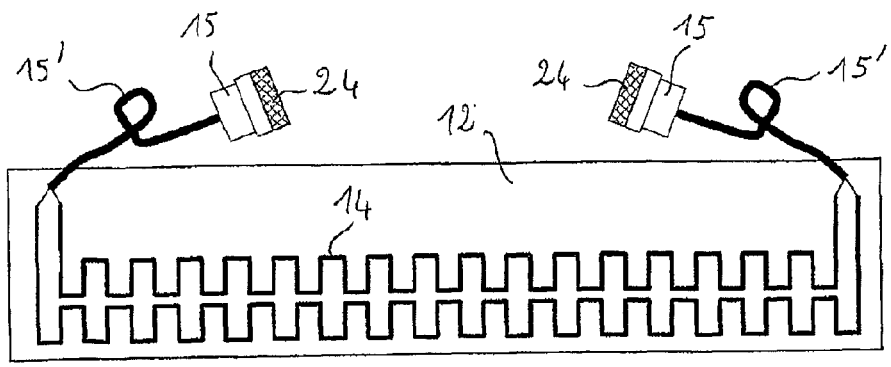
FIGS. 7 to 11 show different variant embodiments of the electrical circuit of the structures according to FIG. 2.
Figure 8:
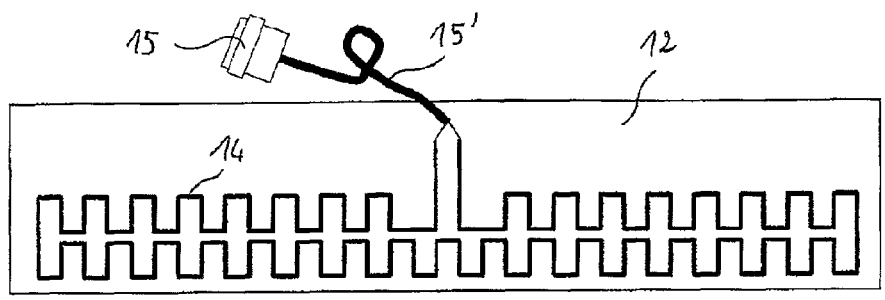
Figure 9:
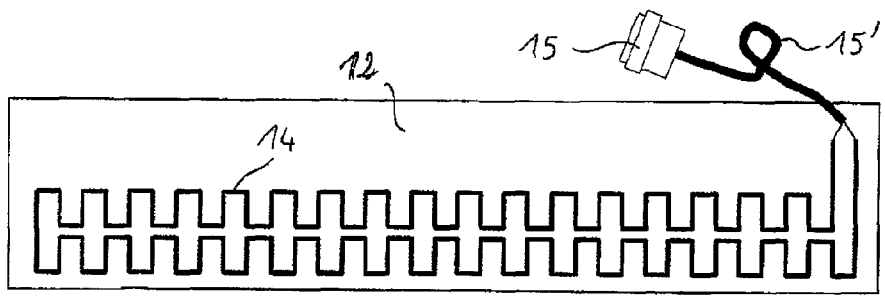
Figure 10:
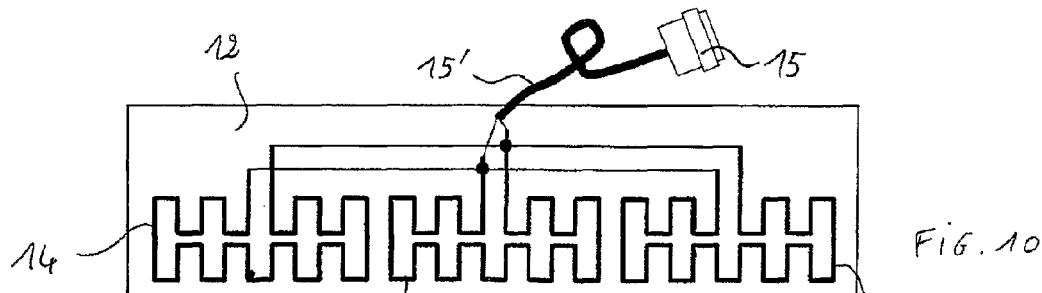
Figure 11:
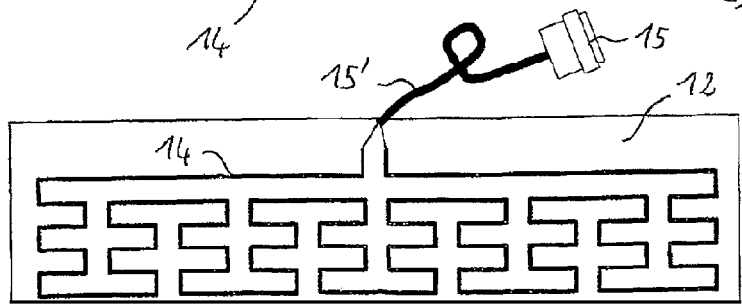

In order to allow access to the various electrical elements provided in the structure 7 of the lip 4a, the connectors 19 can be mounted on removable plates 20 belonging to the front partition 18, as shown more specifically in FIG. 6, which shows a variant embodiment of a pod 1 according to the invention. An operator can access the inside of the structure 7 of the lip 4a by removing the removable plate 20 or one of a plurality of such plates.

Alternatively, the electrical elements can be accessed by means of openings (not shown) formed in the front partition 18 in the vicinity of each connector 19.

Access to this removable plate 20 or to these openings is possible by means of hatches 21 formed in an outer wall 22 of the downstream structure 4b.

Alternatively, the outer wall 22 can be partly associated with movable covers of the mid-section 5, allowing access to the fan casing. In this case, the opening of these movable covers will result in the opening of the outer wall 22 of the downstream structure 4b, thus allowing access to the front partition 18 and to the connectors 19.

Figure 5:
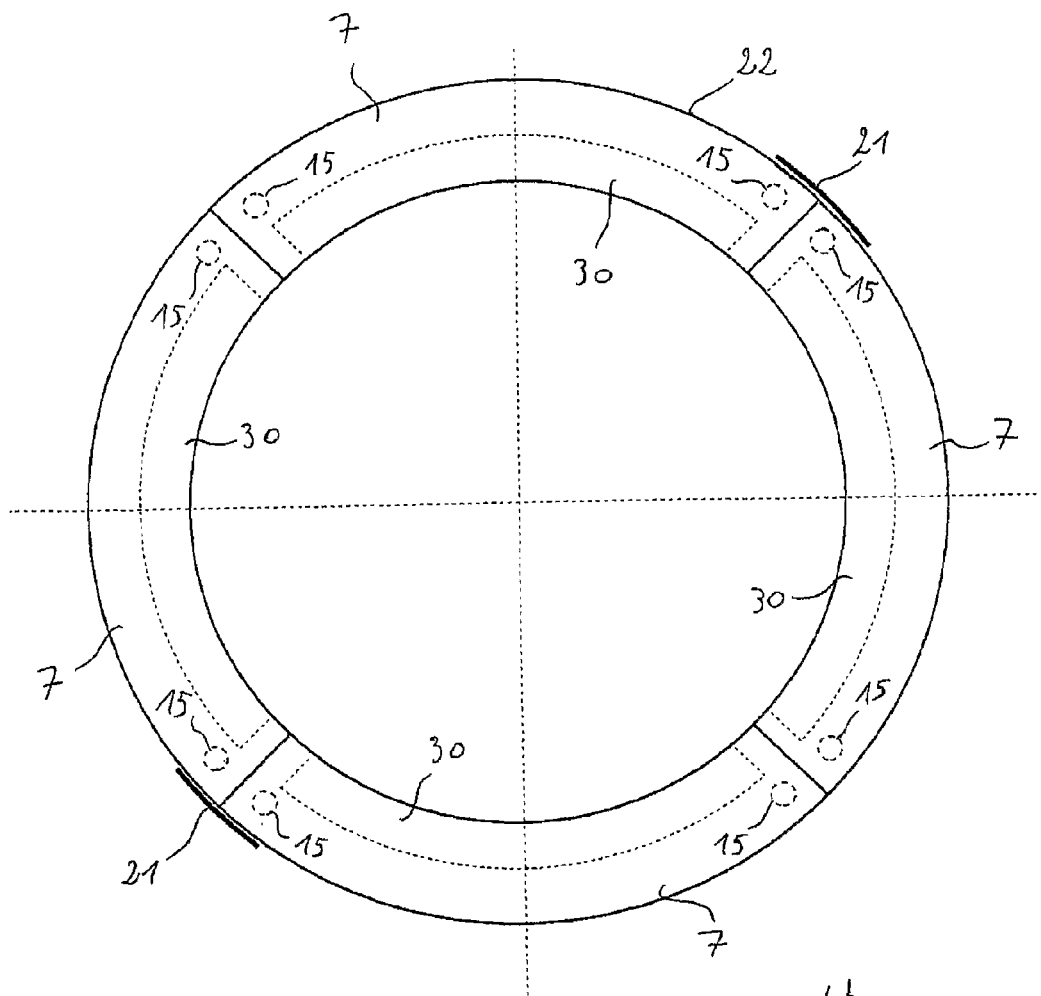
FIG. 5 is a schematic front view of the air inlet lip according to FIG. 4.

One specific arrangement is shown by way of example in FIG. 5. In order to reduce the number of hatches 21 formed in the outer wall 22 of the downstream structure 4b, only two hatches 21 are provided, at two diametrically opposed junctions of structures 7. Each hatch 21 then allows access to the connectors 19 of the two adjacent structures 7.

For this purpose, the power outlets 16 of the downstream structure 4b are positioned in such a way that they are located at least at one end of each structure 7.

To ensure that a structure 7 can be mounted in any position on the downstream structure 4b, the structure 7 has a connector 15 in the vicinity of each end. Each connector 15 is covered by a conducting cap 24. When the connector is positioned, it is simply necessary to withdraw the conducting cap 24 from the connector 15 located opposite the connector 19, and to leave in place the conducting cap 24 located on the other connector 15, in order to maintain the electrical continuity of the corresponding electric heating element 14.

Clearly, although the invention has been described with reference to specific examples of embodiment, it is not restricted in any way by this, but comprises all the technical equivalents of the means described and their combinations where these fall within the scope of the invention.

For example, it should be noted that the electric heating element can be housed in the space delimited by the lip 4a or by each structure 7 respectively, rather than being contained in a sandwich configuration between two skins 12 and 13 of the structure 7.

The invention claimed is:

1. An air inlet of a turbojet pod, comprising:
   an inlet lip made up of at least two identical circumferentially extending sections, each of the identical sections having at least one electric heating element for de-icing; and
   a downstream structure having a front face and at least two structural elements fixed to the front face and extending in an upstream direction;
   wherein, the downstream structure further comprises at least one power supply connector mounted on the front face on either side of the structural elements;
   wherein, the at least two identical sections are attached to the downstream structure and are butted together end-to-end along a periphery of the air inlet pod, such that the respective abutting ends of the identical sections form a joint at the location of each of the structural elements;
   wherein, each electric heating element further comprises at least one electrical connector which is configured to connect to the at least one corresponding power supply connector of the downstream structure.

2. The inlet lip as claimed in claim 1, wherein the inlet lip is made up of four identical sections.

3. The inlet lip as claimed in claim 2, wherein the at least one electrical connector is located substantially in the center of each of the identical sections.

4. The inlet lip as claimed in claim 2, wherein the at least one electrical connector is located substantially at one end of each of the identical sections.

5. The inlet lip as claimed in claim 4, wherein the at least one electrical connector is located at each end of each of the identical sections, each connector configured to receive a conducting cap to maintain the electrical continuity of the connector which is not intended to be connected to the corresponding power supply connector.

6. The downstream structure as claimed in claim 1, wherein the front face comprises at least one opening to allow access to the power supply connector.

7. The downstream structure as claimed in claim 1, wherein the power supply connector is mounted in a removable plate forming a part of the front face of the downstream structure.

8. The downstream structure as claimed in claim 1, further comprising at least one hatch formed in an outer wall of the downstream structure which allows access to the electrical power supply connector.

9. The downstream structure as claimed in claim 8, wherein the hatch is located at the joint between the at least two identical sections of the inlet lip.

10. The downstream structure as claimed in claim 1, further comprising an outer wall which is at least partially associated with movable covers provided on a mid-section of the pod.

11. A turbojet pod, comprising the air inlet and the downstream structure as claimed in claim 1.

* * * * *